United States Patent
Weinzierle et al.

(10) Patent No.: US 9,939,308 B2
(45) Date of Patent: Apr. 10, 2018

(54) LIMIT LEVEL SWITCH COMPRISING AN INTEGRATED POSITION SENSOR

(71) Applicant: VEGA Grieshaber KG, Wolfach (DE)

(72) Inventors: Christian Weinzierle, Wolfach (DE); Roland Welle, Hausach (DE)

(73) Assignee: VEGA GRIESHABER KG, Wolfach (DE)

(*) Notice: Subject to any disclaimer, the term of this patent is extended or adjusted under 35 U.S.C. 154(b) by 11 days.

(21) Appl. No.: 15/013,477

(22) Filed: Feb. 2, 2016

(65) Prior Publication Data

US 2016/0223381 A1 Aug. 4, 2016

(30) Foreign Application Priority Data

Feb. 3, 2015 (EP) .................... 15153642

(51) Int. Cl.
| G01F 23/284 | (2006.01) |
| G01F 23/296 | (2006.01) |
| G01F 23/00  | (2006.01) |
| G01F 25/00  | (2006.01) |
| G01F 22/00  | (2006.01) |
| G01F 23/26  | (2006.01) |

(52) U.S. Cl.
CPC ............ G01F 23/284 (2013.01); G01F 23/00 (2013.01); G01F 23/2967 (2013.01); G01F 25/0061 (2013.01); *G01F 22/00* (2013.01); *G01F 23/26* (2013.01)

(58) Field of Classification Search
CPC ............ G01F 23/0076; G01F 23/0061; G01F 23/0069; G01F 23/00
See application file for complete search history.

(56) References Cited

U.S. PATENT DOCUMENTS

| 5,619,207 A | 4/1997 | d'Hont |
| 8,161,813 B2 | 4/2012 | Faist |
| 2013/0269414 A1* | 10/2013 | Ferraro ............... G01F 23/284 73/1.73 |

FOREIGN PATENT DOCUMENTS

| DE | 10 2012 100 936 | 8/2013 |
| DE | 10 2012 014 307 | 1/2014 |
| EP | 2 124 018 | 11/2009 |
| FR | 2 907 212 | 10/2006 |
| WO | 98/26953 | 6/1998 |
| WO | 2008/047016 | 4/2008 |

* cited by examiner

*Primary Examiner* — Lisa Caputo
*Assistant Examiner* — Punam Roy
(74) *Attorney, Agent, or Firm* — Fay Kaplun & Marcin, LLP

(57) ABSTRACT

A limit level switch includes an integrated position sensor which, when the limit level switch is put into operation, detects information about the installation position of the limit level switch inside a container. This positional information is taken into account when evaluating the measurement signals detected by the limit level switch in order to determine whether or not the measuring probe is surrounded by filling material. This can simplify the evaluation method.

9 Claims, 3 Drawing Sheets

US 9,939,308 B2

LIMIT LEVEL SWITCH COMPRISING AN INTEGRATED POSITION SENSOR

REFERENCE TO RELATED APPLICATIONS

This application claims the benefit of the filing date of European Patent Application Serial No. 15 153 642.2 filed on 3 Feb. 2015, the disclosure of which is hereby incorporated herein by reference.

FIELD OF THE INVENTION

The invention relates to limit level measurement. The invention relates in particular to a limit level switch comprising an integrated position sensor, to a method for determining a limit level of a filling material in a container by means of a limit level switch, to a program element and to a computer-readable medium.

TECHNICAL BACKGROUND

In certain applications, it is important to detect limit levels in order, for example, to prevent the container in which a filling material is stored from overflowing or running dry. Examples for which it is advantageous to detect a predefined fill level are process tanks, storage tanks, silos or pipelines in the process manufacturing industry. Limit level switches, which can also be referred to as limit switches, limit level detectors or limit level measuring instruments, are used for this purpose. Devices of this type can be used in a wide variety of liquids and granulated or pulverised bulk materials.

Different limit level switches are used depending on the property of the filling material and on the individual process conditions. For example, TDR (time-domain reflectometry) detectors, vibration limit switches and sensors which operate in accordance with the capacitive measurement principle are known. A switching command generated by the limit level switch either starts or stops filling apparatuses, such as belt conveyors or pumps, for example.

The measurement signal detected by the limit level switch changes depending on whether or not the measuring probe of the limit level switch is surrounded by filling material. The measurement signal can also depend on whether the measuring probe is clean or whether it is covered in a build-up of deposits (dirt). Complex evaluation methods are often used in order to reliably evaluate the detected measurement signal.

SUMMARY OF THE INVENTION

A first aspect of the invention relates to a limit level switch comprising a position sensor which is either integrated therein or attached thereto. The position sensor is used to detect information about the installation position, and in particular about the orientation of the limit level switch inside the container which contains the filling material, and to transmit the information detected by the position sensor regarding the installation position of the limit level switch to an evaluation unit of the limit level switch.

The limit level switch comprises a measuring probe which is designed to detect a filling material surrounding the measuring probe and to detect a measurement signal which corresponds to this state. The filling material may cover all, half or none of the measuring probe, for example. These states of covering are converted into a corresponding measurement signal by the limit level detector.

This measurement signal is evaluated (analysed) by the evaluation unit (hereinafter also referred to as the processor) of the limit level switch in order to determine whether or not the measuring probe is actually surrounded by the filling material. For example, the evaluation unit can be configured to decide whether the measuring probe comprises a build-up of deposits but is not immersed in the filling material.

The evaluation unit uses the information detected by the position sensor for this evaluation. This simplifies the overall evaluation method since the position sensor can provide useful information about the installation position (for example vertical, pointing downwards, vertical, pointing upwards, horizontal, pointing sideways), such that the evaluation unit can rule out certain scenarios from the very beginning.

Thus, a measurement signal which is detected by a measuring probe which points vertically upwards and is half-covered by the filling material has different characteristics from a measurement signal which has been detected by a measuring probe which points vertically downwards and is half-covered by the filling material, for example. However, it is possible for the measurement signal from a half-covered measuring probe pointing vertically upwards to have similar characteristics to the measurement signal from a measuring probe which is uncovered but dirty, i.e. has a build-up of deposits, and points vertically downwards.

When the measurement signal has a certain characteristic, it can therefore be concluded, solely on the basis of the information regarding whether the measuring probe is pointing vertically upwards or downwards, whether the measuring probe is half-covered by the filling material or whether the measuring probe is dirty.

According to one embodiment of the invention, when evaluating the measurement signal on the basis of the information detected by the position sensor, the evaluation unit is designed to assess whether the detected measurement signal can be attributed to the measuring probe being surrounded by filling material or to the measuring probe being dirty. In order to simplify the evaluation algorithm, the position of the limit level switch detected by the position sensor is used for this assessment. This means that certain states can be ruled out from the very beginning.

According to an additional embodiment of the invention, the information detected by the position sensor only relates to the orientation of the limit level switch (or the measuring probe) relative to the filling material.

According to an additional embodiment of the invention, the information detected by the position sensor relates to both the orientation of the limit level switch relative to the filling material and the position of the limit level switch inside the container.

For example, the detected information regarding the orientation is restricted to whether the limit level switch is attached inside the container so as to point vertically upwards, point vertically downwards or is attached horizontally.

The detected information regarding the position of the limit level switch inside the container is restricted to the installation height of the limit level switch inside the container, for example, and is thus one-dimensional. Two-dimensional or three-dimensional positional information can, however, also be measured depending on the design of the position sensor.

According to an additional embodiment of the invention, the position sensor is designed to automatically detect the information about the installation position of the limit level switch inside the container when the limit level switch is put into operation and to transmit said information to the evaluation unit.

The user thus only has to install the limit level switch in the container and switch it on. Complicated parametrisation, which requires the position and orientation of the sensor to be input manually, can be omitted. This makes it significantly simpler to put the limit level switch into operation.

According to an additional embodiment of the invention, the limit level switch is a TDR limit level measuring instrument, a capacitive switch or a vibration limit level switch.

A further aspect of the invention relates to a method for determining a limit level of a filling material in a container. One or more measurement signals are first detected by means of a measuring probe of the limit level switch. Prior to, at the same time as or after said measurement, information about the installation position of the limit level switch inside the container which contains the filling material is detected by means of a position sensor which is either attached to the limit level switch or is integrated therein. The information detected by the measuring probe and by the position sensor is then transmitted to an evaluation unit of the limit level switch and the detected measurement signal (s) is/are evaluated, taking into account the information detected by the position sensor, in order to determine whether or not the measuring probe is surrounded by filling material. In this way, a build-up of deposits on the probe can also be detected and the instrument can be configured to notify the operator in this case so that the instrument can be serviced/cleaned.

A further aspect of the invention provides a program element which, when executed on a processor of a limit level switch, instructs the limit level switch to carry out the method steps described above and in the following.

A further aspect of the invention provides a computer-readable medium, on which a program element of the above-described type is stored.

The program element may, for example, form part of a piece of software which is stored on a processor of the limit level switch. The processor can, however, also be a subject of the invention.

Furthermore, the program element may use the invention right from the outset or it may be an update which causes a pre-existing program element to make use of the invention.

Embodiments of the invention, given by way of example, are described hereinafter with reference to the drawings.

DETAILED DESCRIPTION OF EMBODIMENTS

Figure 1:
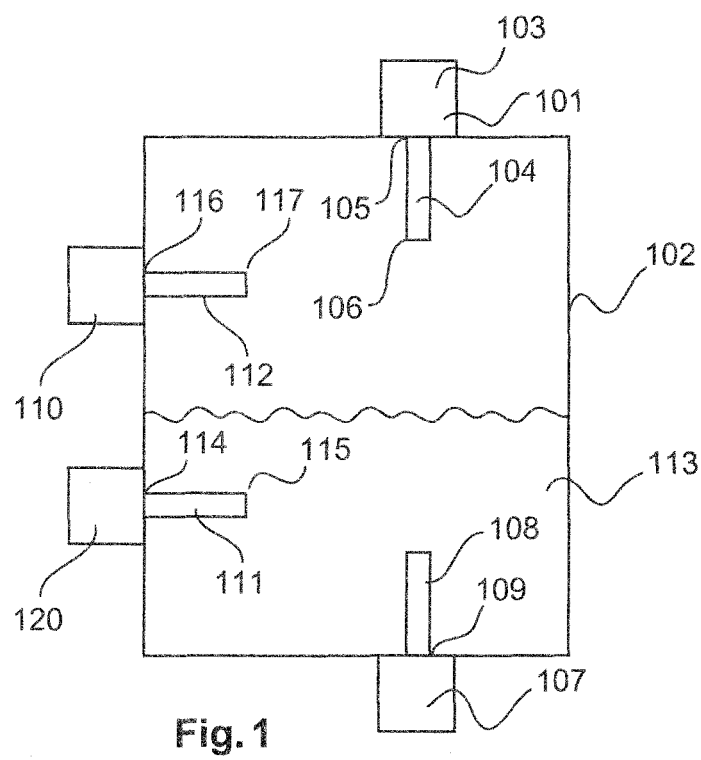
FIG. 1 shows four limit level switches installed in a container.

The illustrations in the figures are schematic and not to scale.

Where the same reference numerals are used in different figures in the following description of the figures, they denote the same or similar elements. However, the same or similar elements may also be denoted by different reference numerals.

FIG. 1 shows a container 102 in which four limit level switches 101, 107, 110, 120 are installed. The first limit level switch 101 is installed in the container 102 from above and points vertically downwards. In industrial applications, this installation position is often used to prevent overflowing. The limit level switch 101 functions for example in accordance with the principle of time-domain reflectometry (TDR) and consists specifically of an electronics unit 103 and an electrically conducting rod 104.

An electromagnetic signal is generated at the electronics unit 103 and is coupled in onto the rod 104 (measuring probe) at the coupling point 105. The signal propagates in a manner guided along the rod 104.

Impedance jumps along the rod 104 cause certain parts of the high-frequency transmitted signal to be reflected and to be transported back to the electronics unit 103 in the form of a received signal.

The received reflection ratios along the rod 104 are converted into an echo curve in the electronics unit and, by analysing the echo curve, a limit level evaluation is carried out.

The reflection ratios and thus also the shape of the echo curve change depending on the extent to which the rod 104 is covered.

In the upper installation position, for example, the end 106 of the rod is first wetted by the medium 113 and the rod 104 is then gradually covered in the direction of the coupling point 105 as a result of the filling process.

In FIG. 1, a second limit level switch or limit level sensor 107 is provided, which operates according to the time-domain reflectometry principle. This switch 107 is installed in the container 102 from below, i.e. pointing vertically upwards. This installation position is usually used to prevent dry-running. In comparison to the upper installation position, the rod 108 of the limit level switch 107 is continuously covered by the filling material starting from the coupling point 109.

The two limit level switches 110, 120 mounted at the side also operate in accordance with the time-domain reflectometry measurement method. Lateral mounting (in this case the limit level switch points vertically sidewards) is usually used for determining a minimum or a maximum fill level. In this installation variant, the rods 111, 112 are installed horizontally in the container 102. As a result, said rods are immediately wetted with the filling medium 113 over their entire length during a filling process. Both the coupling point 114, 116 and the rod ends 115, 117 are covered at the same time.

Irrespective of the installation position in which the four limit level switches 101, 107, 120, 110 are installed, the switching command is always triggered as a result of the echo curve evaluation. In this regard, depending on the application, very high requirements are placed on signal processing in order to be able to issue a secure and reliable switching command at any time.

Figure 2:
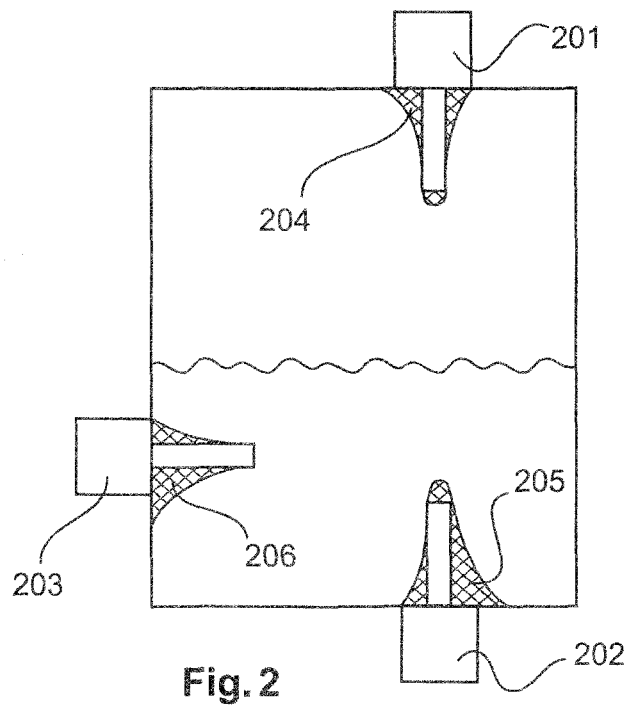
FIG. 2 shows three limit level switches, which are also installed in a container, having a build-up of deposits.

FIG. 2 shows the use of three limit level switches 201, 202, 203, which operate in accordance with the time-domain reflectometry principle and have a heavy build-up of deposits 204, 205, 206 in the respective installation positions thereof. As a result, for example a build-up of deposit in the upper installation position cannot be distinguished from a fill level in the lower installation position if the installation position is unknown. The evaluation unit does not provide a reliable and secure switching command in this case.

Figure 3:
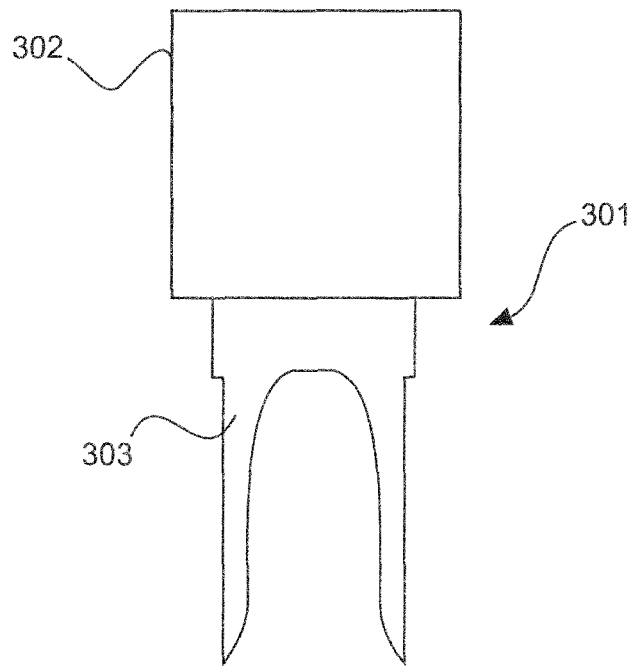
FIG. 3 shows a vibration limit switch according to one embodiment of the invention.

Alternatively to the TDR limit level switches shown in FIGS. 1 and 2, vibration limit level switches can also be used. An example thereof is shown in FIG. 3. The limit level switch 301 comprises an electronics unit 302 and an oscillating fork 303. The fork 303 is excited to its mechanical resonance frequency by means of the electronics unit 302. Depending on the covering process and the degree to which the fork is covered with the filling medium, the frequency and amplitude of the resonance behaviour of said fork change or differ. Since, in practice, the vibration limit level switch is mounted at the top, the bottom or at the side of the container, if the position of the vibration limit switch is unknown, relatively complex signal processing (measurement signal evaluation) is also required in this case in order to ensure secure limit level detection. In particular, it can be very complex in this case to differentiate between whether there is a build-up of deposits (depositions) on the fork 303 and whether the fork is surrounded by a filling material.

Position sensors are integrated in or attached to the limit level switches shown.

Figure 4:
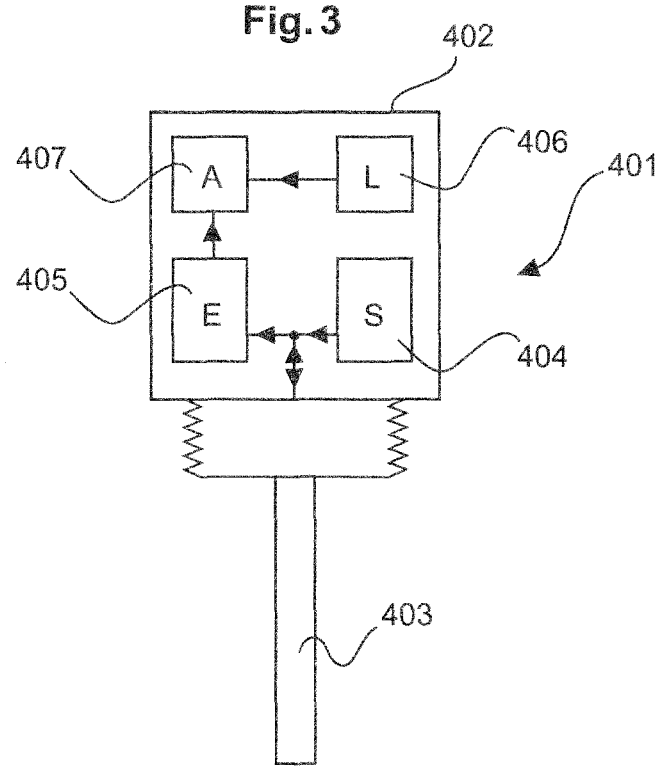
FIG. 4 shows a TDR limit level switch according to one embodiment of the invention.

FIG. 4 shows a corresponding TDR limit level switch 401 in slightly more detail. The limit level switch 401 comprises an electronics unit 402 and an electrically conducting rod 403. A transmission unit 404, a receiving unit 405, a position sensor 406 and an evaluation unit 407 are arranged inside the electronics unit 402. The position sensor 406 and the receiving unit 405 provide the evaluation unit 407 with information about the position of the sensor or the measurement signals detected by the rod 403.

A high-frequency signal which is coupled-in on the rod 403 is generated in the transmission unit 404. Due to impedance jumps along the rod 403, certain signal components of the transmission signal are reflected and received by the receiving unit 405. The reflection ratios on the waveguide 403 are converted in the receiving unit 405 into an echo curve and supplied to the evaluation unit 407. The position sensor 406 also sends the evaluation unit 407 the exact installation position of the limit level detector 401 and/or the orientation (position) of the limit level detector or the rod 403 in relation to the filling material. A build-up of deposit can be identified and the complexity of the evaluation algorithm can also be significantly simplified by taking the installation position into consideration.

Figure 5:
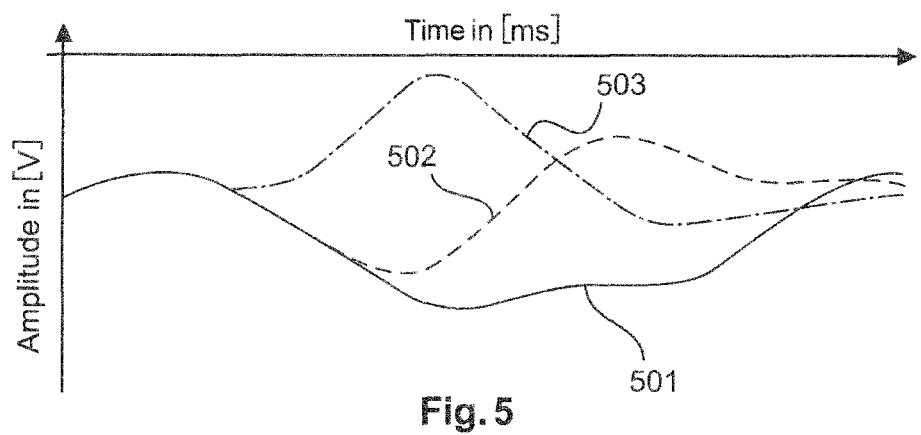
FIG. 5 shows three measurement curves according to one embodiment of the invention.

Three measured echo curves 501, 502, 503 which describe the behaviour of a TDR limit level switch in both the upper and lower installation position are shown in part in FIG. 5. The vertical axis represents the amplitude of the detected measurement signal and the horizontal axis represents the point in time at which the signal was detected.

If there is no contact of any kind between the rod of the limit level switch and the filling medium to be measured, the echo curve 501 is measured. In this case, the evaluation unit does not trigger a switching command. The shape of said echo curve 501 depends on the geometry of the limit level switch and in particular the measuring probe thereof and the measurement signal fed into said probe.

An additional scenario is characterised by the curve shape 502. In this case, the sensor is in the upper installation position and points vertically downwards. As much as half of the rod is covered with water. The evaluation unit triggers a switching command in this case.

The measurement curve 503 denotes the situation in which the limit level switch is in the lower installation position and is pointing vertically upwards. Half of the sensor rod is covered with water in this case, too. The evaluation unit also triggers a corresponding switching command in this case.

Since the evaluation unit knows which curve shape is to be anticipated in which situation for which limit level switch—in the case of an uncovered sensor it anticipates the curve shape 501, in the case of a sensor which is half-covered by the filling material and is pointing vertically downwards in the upper installation position it anticipates the curve shape 502, and in the case of a sensor pointing vertically upwards and which is installed at the bottom of the container it anticipates the curve shape 503 when the sensor rod is half-covered by the filling material—it can quickly decide whether a certain echo curve shape can be attributed to the sensor rod being covered or to it being dirty, for example. Said unit acts accordingly when using a vibration limit level switch. In this case the measurement signal relates to the relationship between the vibration excitation frequency and the oscillation amplitude.

FIG. 5 shows that the behaviour or the shape of the measured echo curves greatly depends on the installation position of the limit level switch and as a result increases the complexity of evaluating the echo curves. If the evaluation unit knows the installation position of the limit level switch as a result of a position sensor, the evaluation can be carried out in a much simpler, more secure and more reliable manner. An additional advantage of the present invention is that a build-up of deposits can be differentiated from a fill level.

Figure 6:
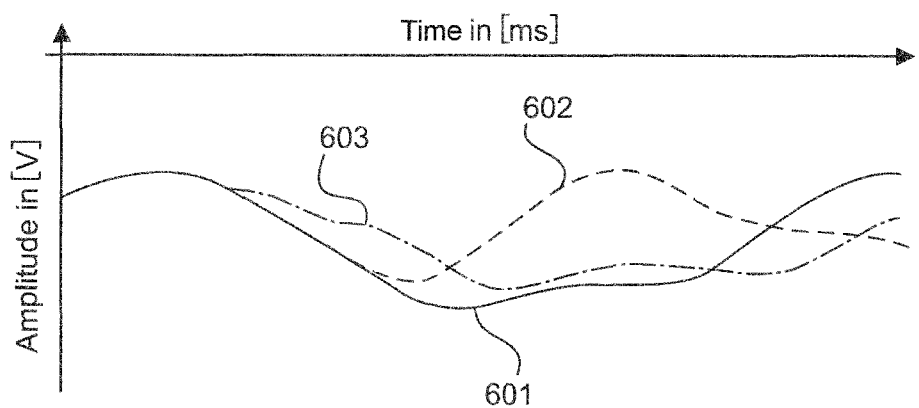
FIG. 6 shows three additional measurement curves according to one embodiment of the invention.

In this regard, FIG. 6 shows three different echo curves 601, 602, 603 in the upper installation position (the limit level switch is thus arranged at the top of the container and points vertically downwards).

If the sensor rod is not in contact with the filling material, the measurement curve 601 is measured (this corresponds to the measurement curve 501 in FIG. 5). If half of the rod is covered with honey, for example, the curve 602 is produced (corresponding to the curve 502 in FIG. 5). Due to deposits or a build-up of deposits in the region of the coupling point, the echo curve 603 is detected. In this case, the rod is not covered and is therefore located above the filling material. By knowing the installation position, the evaluation method can therefore differentiate between a build-up of deposits and a fill level, in which the shape of the echo curve is analysed and compared with known and reliable shapes.

The use of a position sensor to simplify the evaluation method can be expediently applied to both a limit level switch which operates in accordance with the time-domain reflectometry principle and to other sensors, such as vibration limit level switches.

Figure 7:
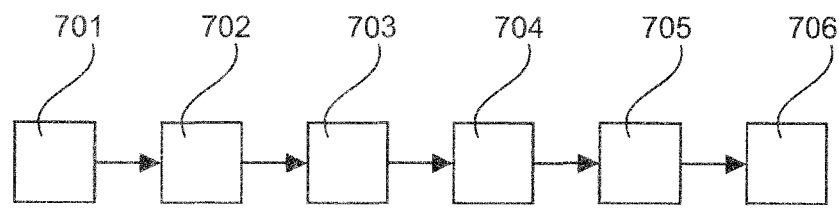
FIG. 7 shows a flow diagram for a method according to one embodiment of the invention.

FIG. 7 is a flow diagram of a method according to one embodiment of the invention. In step 701, the position of the sensor is determined by a position sensor. A measurement signal is generated at the same time, prior to or thereafter, and is introduced into the sensor rod (the measuring probe). In step 702, the measuring probe returns a corresponding measurement signal to the receiving unit of the limit level switch. The measurement signal and the information detected by the position sensor are used by the evaluation unit in step 703 when evaluating the detected measurement signal. In step 704, the evaluation unit determines, for example, that the sensor is dirty and gives off a corresponding message in step 705, which is displayed to the user of the limit level switch in step 706.

The method can differentiate between a build-up of deposits and a fill level by analysing a measurement signal, in that the position of the limit level switch is taken into consideration for this purpose. A basic concept of the invention can be considered that of integrating the position sensor in the limit level switch or attaching it thereto. The position sensor is tasked with identifying the assembly position of the limit level switch and its position inside the container. As a result, the complexity of the evaluation algorithm can be considerably simplified. Furthermore, by taking the installation position into consideration, a differentiation can be made between a build-up of deposit and a fill level. This results in a simpler, more secure and more reliable limit level evaluation.

The invention claimed is:

1. A limit level switch, comprising:
   a measuring probe configure to immerse in a filling material and detect a measurement signal which corresponds to a state of the measuring probe relative to the filling material;
   an evaluation unit configured to evaluate the detected measurement signal in order to determine whether the measuring probe is surrounded by the filling material; and
   an integrated position sensor configured to detect information about an installation position of the limit level switch inside a container which contains the filling material, the sensor further configured to transmit the information to the evaluation unit;
   wherein the evaluation unit is configured to utilize the information detected by the position sensor when evaluating the measurement signal;
   wherein the evaluation unit is further configured to determine, using the information, whether the measuring probe points vertically upwards or downwards, and
   wherein the evaluation unit is further configured to determine, using a shape of the measurement signal, whether the measuring probe is at least one of partially covered by the filling material or dirty.

2. The switch according to claim 1, wherein the information detected by the sensor only relates to an orientation of the switch relative to the filling material.

3. The switch according to claim 2, wherein the detected information regarding the orientation of the switch is restricted to specifying whether the limit level switch is attached inside the container so as to point vertically upwards, point vertically downwards or is attached horizontally.

4. The switch according to claim 1, wherein the information detected by the sensor relates to both an orientation of the switch relative to the filling material and a position of the switch inside the container.

5. The switch according to claim 1, wherein the sensor is configured to automatically detect the information about the installation position of the switch inside the container when the switch is put into operation.

6. The switch according to claim 1, wherein the switch is included in a TDR limit level measuring instrument, a vibration limit level switch, or a capacitive limit level detector.

7. A method for determining a limit level of a filling material in a container using a limit level switch, comprising:
   detecting a measurement signal using a measuring probe, the measurement signal corresponding to a state of the measuring probe relative to the filling material;
   detecting information about an installation position of the switch inside the container, which contains the filling material, using a position sensor;
   transmitting the detected information to an evaluation unit; and
   evaluating the detected measurement signal, using the information detected by the position sensor, in order to determine whether the measuring probe is surrounded by the filling material;
   wherein the evaluating further determines, using the information, whether the measuring probe points vertically upwards or downwards, and
   wherein the evaluating further determines, using a shape of the measurement signal, whether the measuring probe is at least one of partially covered by the filling material or dirty.

8. A non-transitory program element which, when executed on a processor of a limit level switch, instructs the switch to carry out steps according to a method of claim 7.

9. A non-transitory computer-readable medium, on which a program element is stored, the program element, when executed on a processor of a limit level switch, instructing the switch to carry out steps according to a method of claim 7.

* * * * *